Figure 1:
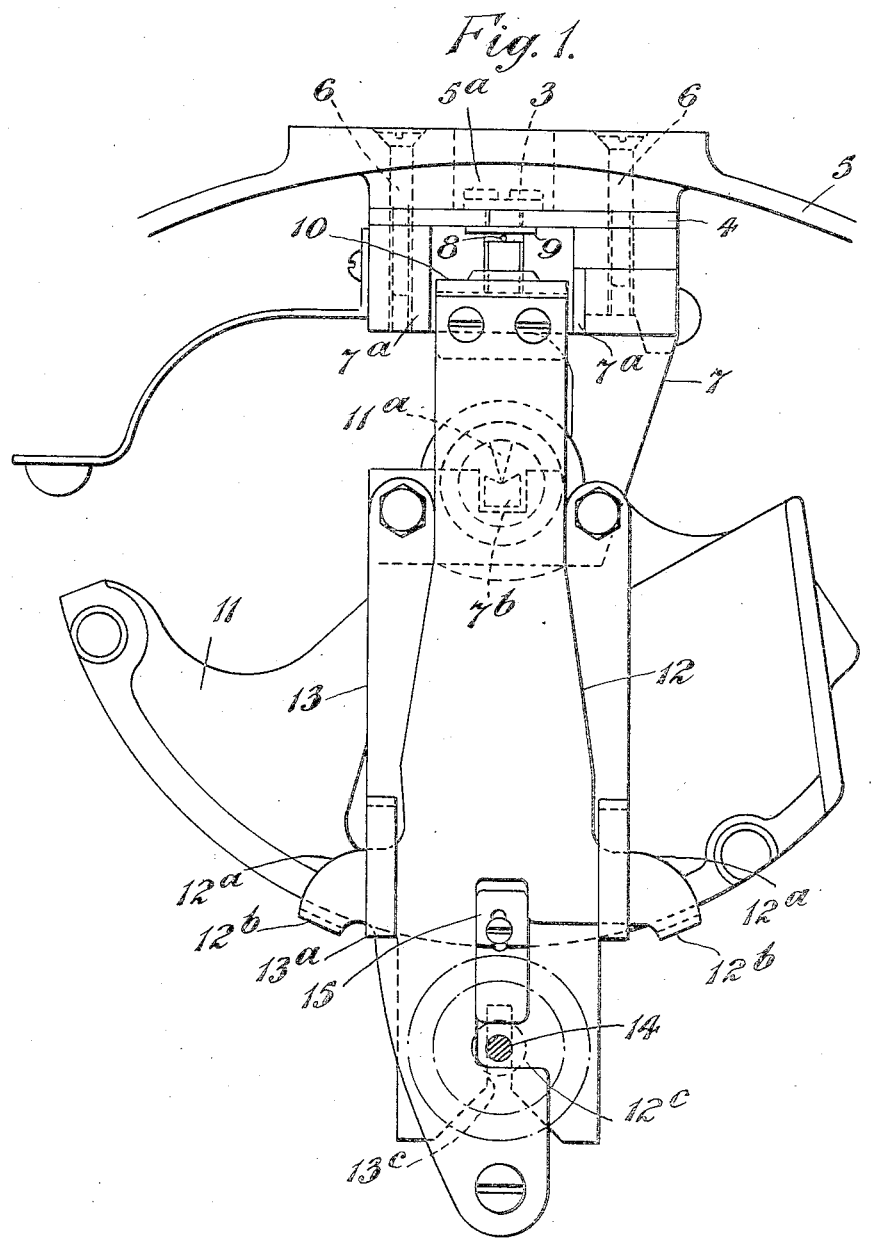

March 24, 1936.  W. TIMSON  2,034,847

LOCKING DEVICE FOR THE INDICATING MECHANISM OF WEIGHING SCALES

Filed Nov. 29, 1932  2 Sheets-Sheet 1

Inventor:- Wm Timson.
Per:- George E. Folkes.
Attorney.

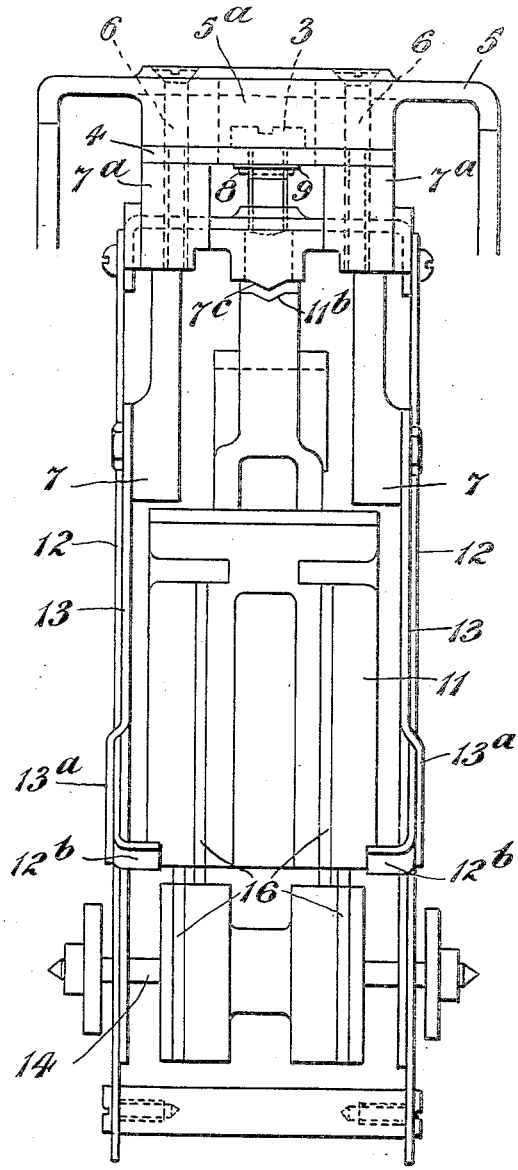

Patented Mar. 24, 1936

2,034,847

UNITED STATES PATENT OFFICE 2,034,847

LOCKING DEVICE FOR THE INDICATING MECHANISM OF WEIGHING SCALES

William Timson, Soho Foundry, Birmingham, England, assignor to W. & T. Avery Limited, Birmingham, England Application November 29, 1932, Serial No. 644,775
In Great Britain December 7, 1931

8 Claims. (Cl. 265—61)

This invention has reference to an improved locking device for the indicating mechanism of weighing scales and has for its specific object the provision of an improved locking device for use with the indicating mechanism for pendulous weighing scales described and claimed in the specification of my prior Patent No. 1,550,125 dated 18th August 1925.

The invention consists of an improved locking device for the indicating mechanism of weighing scales, of the kind hereinbefore referred to, and is characterized in that the locking device is incorporated as a unit with the indicating mechanism so as to be capable of ready installation in and removal from a weighing scale with the said indicating mechanism, as may be required.

The invention further resides in the details of construction of the improved locking device for the indicating mechanism of weighing scales to be described hereinafter.

The invention will now be described with particular reference to the accompanying sheet of drawings, wherein:—

Figure 1 is a front elevation of the locking device and sufficient of the weighing scale as is necessary to an understanding of the invention, showing the locking device in the unlocked condition, and Figure 2 is an end view of Figure 1.

The improved locking device illustrated in the drawings comprises a screw 3 which is rotatably mounted in a hole formed at the centre of a cross bar 4 which is fixed to the circular casing 5 which is to contain the indicating mechanism by screw bolts 6 which serve also to secure to the casing 5 the bracket 7 which supports the indicating mechanism unit. The head of the aforesaid screw 3 is located at the bottom of a cylindrical recess 5ª formed in the said casing so that the said head is partially concealed and not readily susceptible to inadvertent or unauthorized manipulation. This screw 3 is permitted to rotate in the hole in the cross bar 4 but is locked against axial displacement by means of a cotter pin 8 and washer 9. The threaded shank of the screw 3 engages within a screw box formed in the centre of the connecting limb of an inverted U-shaped strap 10 which is slidably mounted between parallel depending guides 7ª formed integral with the aforementioned bracket 7 which bracket carries the bearing block 7ᵇ for the knife-edge 11ª of the pendulous segments 11 of the indicating mechanism described and claimed in my said specification No. 1,550,125. Screwed on to the vertical limbs of the said strap 10 are a pair of catch plates 12 which are located on each side of the slotted guide plates 13 which preserve the position of the spindle 14 of the indicating mechanism. The catch plates 12 are prevented from lateral movement relatively to the guide plates 13 by forming the said guide plates 13 with outwardly projecting tongues 13ª which engage with the edges of the catch plates 12 said tongues 13ª passing over laterally projecting arms 12ª on the catch plates 12. The aforesaid laterally projecting arms 12ª are provided with inwardly turned portions 12ᵇ which are disposed below the periphery of the pendulous segments 11 of the indicating mechanism. Adjacent the lower end the catch plates 12 are provided with cut-away sections 12ᶜ which permit of the unimpeded movement of the spindle 14 of the indicating mechanism when the locking device is out of action.

Screwed to the guide plates 13 so as to partially overlap the vertical portion of the slots 13ᶜ within which the spindle 14 of the indicating mechanism works are adjustable check plates 15, as and for a purpose to be described hereinafter.

The upper portion of the central boss of the pendulous segments 11 is provided with a V-shaped recess 11ᵇ which is disposed below and normally free of a transversely disposed knife-edge 7ᶜ forming part of the bracket 7 which supports the indicating mechanism.

The operation of the locking device is as follows:—

When it is desired to lock the indicating mechanism a screw driver or like tool is inserted in the hole 5ª in the casing 5 and engaged with the slot in the head of the screw 3. The screw 3 is then rotated in a clockwise direction and since the screw is not capable of an axial movement the rotation thereof by reason of the engagement of the shank of the screw 3 with the screw box in the inverted U-shaped strap 10 causes the said strap 10 to be drawn vertically upwards. The vertical movement of the strap 10 is also communicated to the catch plates 12 and initially causes the bottom edge 12ᶜ of the cut-away sections in the said catch plates 12 to contact with the underside of the ends of the spindle 14 of the indicating mechanism and to relieve the tension on the flexible ribbons 16 which support the said spindle 14 and the indicating mechanism carried thereby. With the continued upward movement of the catch plates 12 the inwardly turned portions 12ᵇ of the laterally projecting arms 12ª engage with the underside of the pendulous segments 11 and lift the knife-edge of the said segments 11 off its bearing block 7ᵇ. This lifting movement continues until ultimately the V-shaped recess 11ᵇ on the central boss of the said segments 11 contacts firmly with the knife-edge 7ᶜ on the brackets 7. Simultaneously the lower edges of the cut-away sections 12ᶜ in the catch plates 12 force the spindle 14 into engagement with the lower edges of the check plates 15 whereby the spindle 14 is firmly locked between the said check plates 15 and the lower edges of the cut-away sections 12ᶜ in the catch plates 12.

An unlocking is effected by rotating the screw 3 in a counter clockwise direction.

It will be appreciated that a locking device constructed as hereinbefore described forms a unit with the indicating mechanism and can be installed in and removed from a weighing scale in toto with the indicating mechanism as an assembled and complete unit.

Furthermore, the improved locking device is not susceptible to ready manipulation by inadvertence or by unauthorized individuals.

Moreover, the improved locking device admits of a three-point locking of the indicating mechanism which ensures a rigid locking of the delicate parts of the indicating mechanism in position which eliminates the possibility of damage to these parts when the scale is in transit or storage.

It will also be appreciated that the co-operation between the V-recess 11ᵇ in the centre boss of the pendulous segments 11 and the knife-edge 7ᶜ on the fixed bracket 7 prevents any twisting of the indicating mechanism occurring during a locking and unlocking operation thus preventing the transmission of torsional stresses to the flexible ribbons 16.

What I claim is:—

1. A locking device for the indicating mechanism of weighing scales having carrying means, guides supported from said carrying means, a pendulous segment unit fulcrumed on said carrying means to which the load is applied and which is turned about its fulcrum on the application of a load, a spindle for carrying another indicator and flexible ribbons serving to suspend the said indicator spindle from the pendulous segment unit and to effect a movement of the indicator spindle corresponding to the displacement of the pendulous segment unit, a member displaceably mounted within the aforesaid guides, catch plates carried by said member and located on each side of the indicating mechanism, cut-away parts in said plates through which the ends of the spindle project, projections carried by said catch plates adapted normally to be located below the pendulous segment unit, a fixed abutment disposed above the fulcrum of the pendulous segment unit against which the fulcrum is pressed when the unit is locked and means for effecting the upward movement of the aforesaid member and plates the upward movement of the aforesaid member engendering the lifting of the indicator spindle, the relieving of the tension in the suspension ribbons, the lifting of the fulcrum of the pendulous segment unit off the carrying means and the locking of the indicating mechanism as a whole against movement.

2. A locking device for the indicating mechanism of weighing scales of the kind having a carrying means for the indicating mechanism as a whole, a pendulous resistant fulcrumed on said carrying means, a spindle for carrying an indicator and flexible ribbons serving to suspend the indicator spindle from the resistant mechanism and to effect a movement of the indicator spindle corresponding to the displacement of the resistant mechanism, a member coacting with said spindle and said resistant displaceably mounted relatively to said carrying means and means for effecting an upward movement of the said displaceable member said upward movement engendering the lifting of the indicator spindle, the relieving of the tension in the suspension ribbons, and the lifting of the fulcrum of the pendulous segment unit off the carrying means.

3. A locking device for the indicating mechanism of weighing scales having carrying means, guides supported from said carrying means, a pendulous segment unit fulcrumed on said carrying means, a spindle for carrying an indicator and flexible ribbons serving to suspend the said indicator spindle from the pendulous segment unit and to effect a movement of the indicator spindle corresponding to the displacement of the pendulous segment unit, a member displaceably mounted relatively to said carrying means, a screw having an engagement with the said member whereby a displacement of the member can be effected relatively to the carrying means and means coacting with said spindle and said segment unit which upon an upward displacement of the aforesaid member engender the lifting of the indicator spindle, the relieving of the tension in the suspension ribbons, and the lifting of the fulcrum of the pendulous segment unit off the carrying means.

4. A locking device for the indicating mechanism of weighing scales having carrying means, guides supported from said carrying means, a pendulous segment unit fulcrumed on said carrying means, a spindle for carrying an indicator and flexible ribbons serving to suspend the said indicator spindle from the pendulous segment unit and to effect a movement of the indicator spindle corresponding to the displacement of the pendulous segment unit, a member displaceably mounted relatively to said carrying means, means operatively connected to said member for effecting a displacement thereof, means coacting with said spindle and said segment unit which upon the upward displacement of the aforesaid member engender the lifting of the indicator spindle, the relieving of the tension in the suspension ribbons, and the lifting of the fulcrum of the pendulous segment unit off the carrying means and means for preventing the transmission of torsional stresses to the flexible ribbons during a locking and unlocking operation.

5. A locking device for the indicating mechanism of weighing scales having carrying means, guides supported from said carrying means, a pendulous segment unit fulcrumed on said carrying means, a spindle for carrying an indicator and flexible ribbons serving to suspend the said indicator spindle from the pendulous segment unit and to effect a movement of the indicator spindle corresponding to the displacement of the pendulous segment unit, a member displaceably mounted relatively to said carrying means, means interconnecting said carrying means and member said interconnecting means being capable of actuation to effect a displacement of the member relatively to the carrying means, and catch plates carried by the said member and co-acting with said segment to effect a lifting of the pendulous resistant mechanism.

6. A locking device for the indicating mechanism of weighing scales having carrying means, guides supported from said carrying means, a pendulous segment unit fulcrumed on said carrying means, a spindle for carrying an indicator and flexible ribbons serving to suspend the said indicator spindle from the pendulous segment unit and to effect a movement of the indicator spindle corresponding to the displacement of the pendulous segment unit, a member displaceably mounted relatively to said carrying means, a screw means interconnecting said carrying means and member and adapted to be manipulated so as to effect a displacement of the said member relatively to the carrying means, catch plates fixed to said member, projections on said catch plates adapted to extend below the resistant mechanism and to effect a lifting thereof when an upward displacement of the aforesaid member takes place said catch plates having a slotted portion an edge of which contacts with a part of the indicator spindle when an upward movement of the catch plates takes place and check plates mounted on said carrying member said part of the indicator spindle co-acting with said check plates when moved upwardly by said catch plates to lock the indicator spindle against movement.

7. A locking device for the indicating mechanism of weighing scales having carrying means, guides supported from said carrying means, a pendulous segment unit fulcrumed on said carrying means, a spindle for carrying an indicator and flexible ribbons serving to suspend the said indicator spindle from the pendulous segment unit and to effect a movement of the indicator spindle corresponding to the displacement of the pendulous segment unit, a member displaceably mounted relatively to said carrying means, a screw means interconnecting said carrying means and member and adapted to be manipulated so as to effect a displacement of the said member relatively to the carrying means as required, catch plates fixed to said member, projections on said catch plates adapted to extend below the resistant mechanism and to effect a lifting thereof when an upward displacement of the aforesaid member obtains, said catch plates having a slotted portion an edge of which contacts with a part of the indicator spindle when an upward movement of the catch plates takes place and check plates mounted on said carrying member said part of the indicator spindle co-acting with said check plates when moved upwardly by said catch plates to lock the indicator spindle against movement and co-acting locking means on said carrying member and segment operable upon movement of said segment to lock said segment against movement and prevent the transmission of torsional stresses to the flexible ribbons during a displacement of the said member.

8. A locking device for the indicating mechanism of weighing scales having carrying means, guides supported from said carrying means, a pendulous segment unit fulcrumed on said carrying means, a spindle for carrying an indicator and flexible ribbons serving to suspend the said indicator spindle from the pendulous segment unit and to effect a movement of the indicator spindle corresponding to the displacement of the pendulous segment unit, a member displaceably mounted relatively to said carrying means, a screw means interconnecting said carrying means and member and adapted to be manipulated so as to effect a displacement of the said member relatively to the carrying means as required, catch plates fixed to said member, projections on said catch plates adapted to extend below the resistant mechanism and to effect a lifting thereof when an upward displacement of the aforesaid member obtains said catch plates having a slotted portion an edge of which contacts with a part of the indicator spindle when an upward movement of the catch plates takes place and adjustable check plates mounted on said carrying member said part of the indicator spindle co-acting with said check plates when moved upwardly by said catch plates to lock the indicating spindle against movement.

WILLIAM TIMSON.